Patented Dec. 28, 1948

2,457,677

UNITED STATES PATENT OFFICE 2,457,677

ORGANO-SILOXANES AND METHOD OF MAKING THEM

James Franklin Hyde, Corning, N. Y., assignor to Corning Glass Works, Corning, N. Y., a corporation of New York No Drawing. Application December 15, 1943, Serial No. 514,410

4 Claims. (Cl. 260—448.2)

This invention relates to new compositions of matter and their preparation and, more particularly, to organo-siloxanes and methods of preparing them.

The present application is a continuation-in-part of my copending applications Serial Number 432,528 filed February 26, 1942, Serial Number 467,146 filed November 27, 1942 and Serial Number 503,159 filed September 20, 1943, said applications all being assigned to the assignee of the present application.

Organo-silanes having the general formula RR'SiXY can be prepared by means of the well-known Grignard reaction, where R and R' represent the same or different organic radicals which are attached to silicon through carbon-silicon linkages and which are capable of reacting with magnesium to form a Grignard reagent and where X and Y represent the same or different hydrolyzable radicals such as hydrogen, halogens, alkoxy, aroxy, acyloxy, etc. By hydrolyzable radical is meant, in general, any radical which is attached to silicon by other than carbon-silicon linkages and which under the same set of conditions is more readily hydrolyzed than an organic radical directly attached to silicon through carbon-silicon linkage. Such organo-silanes may be hydrolyzed and dehydrated, the dehydration probably proceeding to some extent concurrently with the hydrolysis, particularly if the temperature is allowed to rise.

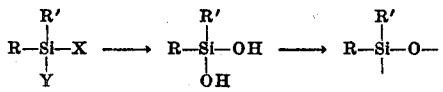

The formation of a siloxane linkage requires the close approach of two hydroxyl groups and subsequent elimination of water. It may also result from the close approach of one hydroxyl group to a hydrolyzable group such as halogen, acyloxy, or alkoxy and subsequent elimination of a hydrogen halide, a carboxylic acid or an alcohol respectively. Such eliminations are catalyzed by mineral acids, especially hydrochloric and sulphuric acids, and alkali-metal hydroxides, especially sodium hydroxide.

In each of the above structural units two of the four silicon bonds are shown blocked by the organic radicals R and R', and only two siloxane linkages are possible. Hence a three-dimensional network is no longer possible, and the resulting organo-siloxanes can comprise only chain and cyclic structures. Intermediate crystalline di-hydroxy compounds can in some instances be isolated. The final products are usually liquids, although crystalline polymers may be isolated in some instances.

Organo-silanes of the type RR'R"SiX, when hydrolyzed and dehydrated, yield very simple oxides in the structural unit of which three of the four silicon bonds are blocked by the organic radicals R, R' and R".

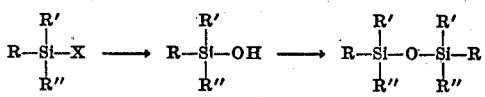

In this case, ease of hydrolysis is further diminished and in some cases the intermediate hydroxy silanes can be isolated. The completely dehydrated product is dimeric because only one siloxane linkage can be formed. The dimers are either crystalline or liquid.

Prior attempts to utilize the above-described reactions have not contemplated combinations thereof, but have been confined more or less to the individual reactions and their products. Such products, as shown above, have limited utility and the range of properties obtainable in the products of a given type of reaction is relatively restricted. For example, the hexa-organo-disiloxanes are generally inert liquid products which, although they are soluble in organic solvents, cannot be condensed beyond the dimer.

An object of this invention is the production of new and useful products from these reactions which will have desirable predetermined properties.

Another object is to combine the above-described reactions and thus to inter-condense the hydrolysis products of di-organo-substituted silanes and tri-organo-substituted silanes.

Another object is to produce liquid products of varying viscosity.

Another object is to produce polymeric liquid products which possess great resistance to further polymerization.

A still further object of the present invention is to provide a method of preparing an organo-siloxane which comprises essentially oxygen atoms and organo-silicon units which correspond to the general formulae

and

said units being connected by said oxygen atoms through silicon-oxygen linkages, where R, R', R'', R''', and R'''' represent the same or different organic radicals attached to silicon through carbon-silicon linkages.

Another object of my invention is to prepare organo-siloxanes comprising essentially oxygen atoms and organo-silicon units which correspond to the general formulae

and

said units being connected by said oxygen atoms through silicon-oxygen linkages, and said siloxanes containing more than two silicon atoms per molecule.

Another object of this invention is the production of a class of linear inter-condensation polymers hereinafter referred to as tri-organo-silicyl end-blocked poly-siloxanes of the generic formula

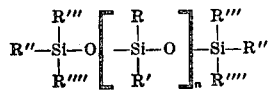

where R, R', R'', R''' and R'''' are hydrocarbon radicals and $n$ is an integer.

The new method comprises mixing at least one silane of the general formula RR'SiXY with at least one silane of the general formula

where R, R', R'', R''' and R'''' are the same or different organic radicals and X, Y, and Z are the same or different hydrolyzable radicals and causing them to hydrolyze together and to become inter-condensed. It is to be understood that each of the silanes is present in appreciable quantity, i. e. in amount sufficient to produce a perceptible effect in the resulting inter-condensate. One method of accomplishing this is by introducing into the mixture by dropwise addition thereto the amount of water which is calculated for complete hydrolysis of the mixture and which preferably is dissolved in from two to four volumes of a common solvent such as alcohol, dioxan, acetic acid, acetone, etc. Although a difference in the reactivity of the various individual types of hydrolyzable compounds and a variation in the amounts present in the initial mixture may make it desirable to vary the conditions of the process, as will appear from a consideration of the accompanying examples, the above recited procedure in general is to be preferred. The use of a water miscible solvent for diluting the hydrolyzable mixture or the water or both and the dropwise addition of the water insures the maintenance of homogeneity during hydrolysis. Under these conditions condensation or the formation of siloxane linkages occurs concurrently with the hydrolysis, but it is to be understood that the extent of further subsequent dehydration is optional and will depend largely upon the use to which the product will be put.

In a mixture comprising at least one hydrolyzable di-organo-substituted-silane and at least one hydrolyzable tri-organo-substituted-silane, hydrolysis and dehydration by my method will result in inter-condensation or formation of inter-connecting oxygen linkages between the silicon atoms of the various silanes. The variety of the substituted organic radicals is limited only by their ability to form a Grignard reagent. In other words, the organo-silanes which may be employed in my process include all such compounds which contain one or more hydrolyzable atoms or groups and which may be prepared by means of the well-known Grignard reaction. The radicals which may thus be substituted may include alkyl radicals such as methyl, ethyl, propyl, isoproply, butyl, iso-butyl, amyl, hexyl, heptyl to octadecyl and higher; alicyclic radicals such as cyclopentyl, cyclohexyl, etc.; aryl and alkaryl radicals such as phenyl, mono- and poly-alkyl phenyls as to tolyl, xylyl, mesityl, mono-, di-, and tri-ethyl phenyls, mono-, di-, and tri-propyl phenyls, etc.; naphthyl, mono- and poly-alkyl naphthyls, as methyl naphthyl, diethyl naphthyl, tripropyl naphthyl, etc.; tetra-hydronaphthyl, anthracyl, etc.; aralkyl such as benzyl, phenyl-ethyl, etc.; alkenyl such as methallyl, allyl, etc. The above radicals may contain inorganic substituents such as halogens, etc.

If the hydrolyzable group or groups of all of the silanes in the mixture to be hydrolyzed are halogens, it is preferable to employ dioxan as the solvent because it is inert to the halogens. If the mixture contains both halogens and alkoxy groups, the former can be converted to the latter by the slow addition of dry alcohol to the mixture, or the mixture can be diluted with dioxan and treated with aqueous alcohol. When the mixture contains only alkoxy groups any water miscible solvent may be used together with a trace of acid such as HCl as catalyst. In this case, alcohol may be preferred on account of its relatively low cost. Mixtures of water miscible solvents may be used.

In the above-described method, the slow incorporation of water into the homogeneous solution insures that hydrolysis is not permitted to proceed unchecked, whereby the more reactive silane or silanes, would be more completely hydrolyzed and condensed before the less reactive silanes have had an opportunity to react. On the contrary, the less reactive silanes are thus given a greater opportunity to hydrolyze simultaneously with the more reactive silanes than would be the case if the hydrolysis were conducted rapidly. Under these circumstances, simultaneous condensation of the various intermediate hydroxy compounds takes place and an intimate inter-molecular combination through siloxane linkages of silicon atoms bearing different numbers and kinds of organic radicals becomes possible to the fullest extent. This insures a true inter-condensation with the formation of homogeneous products containing mixed unit structures.

After removal of solvent and excess water the hydrolysis products resulting from the above process are water-immiscible liquids of varying viscosity. They are soluble in the common organic solvents such as benzene, toluene, etc. They vary in the extent to which dehydration has occurred at this stage. The ease of further dehydration depends upon the kind of substituted organic radicals and upon their number or upon the final ratio of oxygen to silicon. Subsequent heating is usually necessary for complete dehydration. Products containing methyl radicals dehydrate more readily than those containing ethyl, propyl, etc., radicals or phenyl radicals and in general products containing alkyl radicals dehydrate more readily than those containing aryl radicals. The extent of further dehydration also depends upon the percentage of tri-organo-silicyl units present, the greater the amount of the tri-organo-silicyl units present the fewer hydroxyl groups that are available to take part in subsequent condensation reactions.

In general, the completely dehydrated products are thermally stable or "permanent" liquids, that is, they are liquids which are incapable of further change by condensation. They comprise linear polymers whose ends are blocked by tri-organo-silicyl units. Polymerization of these polymers can only be accomplished by removal of groups or by rupture of Si-O linkages, both of which require special treatment. The viscosity of the products may be controlled by regulating the relative proportions of di- and tri-organo-silicyl units, the greater the percentage of di-organo-silicyl units, the higher the resultant viscosity.

The following examples will illustrate the mode of operation of the process and the character of the resulting products. In the examples, the starting compound $(C_6H_5)(CH_3)_2SiCl$ was prepared by silicon tetra-chloride by the action of the phenyl and methyl Grignard reagents under substantially anhydrous conditions. Fractional distillation of the reaction product yielded $(C_6H_5)(CH_3)_2SiCl$ boiling at 79° C. at 15 mm. pressure. The starting compound $$(CH_3)_3Si(OC_2H_5)$$

was prepared by reacting methylmagnesium halide with $(CH_3)_2Si(OC_2H_5)_2$ under substantially anhydrous conditions and fractionally distilling the reaction product to recover the trimethylethoxysilane boiling at 75.7° C. at 760 mm. pressure. The other starting compounds were prepared in the conventional manner, i. e. by reacting the proper Grignard reagent with either silicon tetrachloride, ethyl orthosilicate or organic derivatives thereof in suitable molar ratios and fractionally distilling the product.

EXAMPLE 1

Equimolecular parts of $(C_6H_5)(CH_3)_2SiCl$ and $(CH_3)_2Si(OC_2H_5)_2$ were mixed and treated dropwise with the calculated amounts of water for complete hydrolysis diluted with four volumes of alcohol. On evaporation of solvent a mobile liquid remained which was unchanged by heating and which performed satisfactorily as a transformer oil.
Composition: O/Si=0.75

EXAMPLE 2

Two equivalents of $(C_6H_5)(CH_3)SiCl_2$ and one of $(C_6H_5)(CH_3)_2SiCl$ were mixed and diluted with dioxane. An amount of water slightly in excess of the calculated quantity was slowly added. On dilution with water after completion of the inter-condensation, the product was precipitated as an oil.
Composition: O/Si=0.83

EXAMPLE 3

2 cc. of anhydrous ethyl alcohol were added to 1 gram of tribenzylsilicon chloride and 8.7 grams of $(CH_3)_2Si(OC_2H_5)_2$. The mixture was allowed to stand for one hour and then an equal volume of a 1/1 mixture of concentrated aqueous HCl and 95% ethyl alcohol was added. The mixture was heated and then diluted with water. The product was a homogeneous oil having useful lubricating properties.
Composition: O/Si=.975

EXAMPLE 4

To a solution of $(CH_3)_3Si(OC_2H_5)$ and $(CH_2=C(CH_3)CH_2)_2SiCl_2$ in the molar proportions 1/2 was added slowly 95% ethyl alcohol to effect hydrolysis and inter-condensation. Water was then added in slight excess. After boiling off the solvents, an oily liquid remained.
Composition. O/Si=0.83

EXAMPLE 5

To a solution of $(C_6H_5 \cdot CH_2)(C_6H_5)SiCl_2$ and $(CH_3)_3Si(OC_2H_5)$ in the molar proportions 1/2 was added slowly 95% ethyl alcohol to effect hydrolysis and inter-condensation. Water was then added in slight excess. After boiling off the solvents, the concentrated product was a slightly viscous liquid.
Composition: O/Si=0.67

EXAMPLE 6

To a solution of $(CH_3)_2Si(OC_2H_5)$ and $(CH_3)_3Si(OC_2H_5)$ in equimolar proportions 95% ethyl alcohol containing a few drops of concentrated hydrochloric acid was added slowly with warming to effect hydrolysis and inter-condensation. Water was then added in excess. After evaporating the solvents, a low viscosity liquid product of wide boiling range was obtained.
Composition: O/Si=0.75

EXAMPLE 7

As in the previous example $(CH_3)_2Si(OC_2H_5)_2$ and $(CH_3)_3Si(OC_2H_5)$ were cohydrolyzed and inter-condensed, except that the molecular proportions were 10/1 respectively. A liquid product of somewhat higher viscosity and boiling range than that in the previous example was obtained.
Composition: O/Si=0.95

EXAMPLE 8

To a solution of $(C_6H_5 \cdot CH_2)_3SiCl$ and $$(CH_3)_2Si(OC_2H_5)_2$$

in the molar proportions 1/5 was added slowly 95% ethyl alcohol to effect hydrolysis and inter-condensation. Water was then added in slight excess. After boiling off the solvents, the concentrated product was a rather viscous liquid.
Composition: O/Si=0.92

For many uses, particularly in fluid pressure operated devices, it is preferred to use instead of the above mixtures of polymers having a range of physical properties, an individual polymer of the species $$R_3SiO{-}\!\!\left[\begin{array}{c}R\\|\\Si{-}O\\|\\R\end{array}\right]_n\!\!{-}SiR_3$$

having the definite physical properties of a pure chemical compound where the R's represent the same or different hydrocarbon radicals. These may be obtained by isolation of the individual members from the hydrolysate of a mixture of $R_3SiX$ and $R_2SiX_2$ which is prepared in such a manner as to be substantially completely hydrolyzed and free from cyclic polymers of the formula $(R_2SiO)_x$. This is illustrated by Example 9 which shows the preparation of a random mixture of polymers belonging to the series $$(CH_3)_3Si{-}O{-}\!\!\left[\begin{array}{c}CH_3\\|\\Si{-}O\\|\\CH_3\end{array}\right]_n\!\!{-}Si(CH_3)_3$$

and the separation of the individual members where n is 1 through 13 by distillation under high vacuum.

EXAMPLE 9

In a 5 liter three-necked flask, fitted with a reflux condenser, agitator and thermometer, were placed 1393 grams (9.41 mol) of redistilled $(CH_3)_2Si(OC_2H_5)_2$ and 1110 grams (9.41 mol) of $(CH_3)_3SiOC_2H_5$. To this solution was added 254 grams (14.11 mol) of water containing 7.5 grams of NaOH, (approximately 1 NaOH per 100 silicon atoms). This insured the formation of only straight chain polymers. The mixture was heated to 40° C. and the temperature continued to rise for nearly an hour. After adding 50 cc. (20% excess) more water, the mixture was refluxed for 2 hours and then allowed to stand overnight.

Alcohol was then distilled off, until the temperature reached 100° C. 1706.6 grams of distillate was collected. (Theory 1430 grams.) This alcohol was poured into four times its volume of water and an insoluble oil separated (457 grams). The insoluble fraction was added back to the copolymer residue from the distillation and 555 cc. of 20% hydrochloric acid was added. The acid mixture was refluxed for two hours, and the silicon oils were carefully washed with distilled water until neutral. The yield was 1426 grams (Theory 1469 grams).

The oil was distilled in a fractionating column packed with glass helices, first at atmospheric pressure, then at reduced pressure. The fractions from the plateaus in the distillation curve were fractionated and the properties of the pure siloxane polymers were determined. These are shown in the data of Table I, section A from which it appears that the individual fractions are members of the series

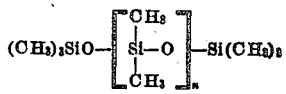

where $n=0$ to 7 inclusive, that is, the fractions consisted of trimethylsilicyl ether and inter-condensates of $(CH_3)_3Si$—O— with

containing from 3 to 9 silicon atoms inclusive. The residue (178 grams) from the fractional distillation was placed in a Claissen flask and distilled under high vacuum without fractionation. This gave a clear distillate distilling over a range of from 125° to 215° C. at 0.125 mm. Refractionation of this distillate showed it to be composed of members of the above series where n is 8 to 13 inclusive. That is, it consisted of inter-condensates of $(CH_3)_3Si$—O— with

containing from 10 to 15 silicon atoms inclusive. The properties of these materials are shown in Table I, section B. An undistilled residue of 39.1 grams remained. This was treated with decolorizing carbon and filtered to give the final residue as shown in the following Table I, section C. Evidently, this residue contained linear polymers having more than 15 silicon atoms in the molecule.

TABLE I

*Physical properties of trimethylsilicyl end blocked dimethyl siloxane polymers*

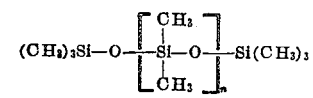

|  | No. of Si Atoms | B. P., °C. | Absolute Viscosity in Centistokes | | Specific Gravity at 25° C. | Ref. Index at 25° C. | Flash Point, °F. | Coeff. of Expansion 25° C. to 100° C.×10⁻³ |
|---|---|---|---|---|---|---|---|---|
|  |  |  | 25° C. | 40° C. |  |  |  |  |
| Section A | 2 | 99.5 | 0.65 | 1.76 | .7606 | 1.3748 | 15 | 1.50 |
|  | 3 | 152 | 1.04 | 2.97 | .8182 | 1.3822 | 98 | 1.451 |
|  | 4 | 192 | 1.53 | 4.99 | .8516 | 1.3872 | 158 | 1.312 |
|  | 5 | 115/20 mm | 2.06 | 7.38 | .8710 | 1.3902 | 202 | 1.247 |
|  | 6 | 140/20 mm | 2.63 | 9.67 | .8873 | 1.3922 | 245 | 1.206 |
|  | 7 | 87/0.5 mm | 3.24 | 12.50 | .9004 | 1.3940 | 272 | 1.154 |
|  | 8 | 102/0.5 mm | 3.88 | 16.40 | .9078 | 1.3952 | 292 | 1.136 |
|  | 9 | 119/0.5 mm | 4.58 | 19.90 | .9140 | 1.3963 | 318 | 1.110 |
| Section B | 10 | 136/0.5 mm | 5.35 | 23.5 | .9202 | 1.3973 | 350 | 1.078 |
|  | 11 | 152/0.5 mm | 6.10 | 28.3 | .9247 | 1.3982 | 371 | 1.055 |
|  | 12 | 177/0.5 mm | 6.85 | 33.2 | .9284 | 1.3990 | 389 | 1.034 |
|  | 13 | 192/0.5 mm | 7.75 | 38.0 | .9317 | 1.3998 | 406 | 1.016 |
|  | 14 | 207/0.5 mm | 8.70 | 44.3 | .9314 | 1.4004 | 422 | .999 |
|  | 15 | 222/0.5 mm | 9.65 | 50.5 | .9368 | 1.4010 | 437 | .983 |
| Section C | Residue |  | 12.0 | 65.0 | .9454 | 1.4008 | 458 |  |

In the preparation of mixtures of molecular species having the general formula

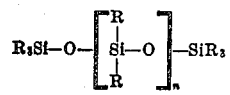

it is apparent that the average value of $n$ will depend in general upon several factors which include (1) the molecular ratio of

to

in the mixture to be hydrolyzed; (2) the relative ease of hydrolysis of the hydrolyzable group Z to that of the groups X and Y; (3) the relative ease of elimination of HZ to HX and HY or of HOH in the event of incomplete hydrolysis of groups X, Y, and Z at any instant during the hydrolysis and inter-condensation.

It is recognized also in the preparation of tri-organo-silicyl end-blocked polysiloxanes by the said conjoint hydrolysis and inter-condensation of a mixture of $R_3SiZ$ and $R_2SiXY$ that such preparations may contain linear molecules of the general formula

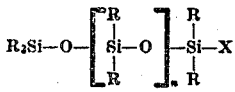

in which one end of the polysiloxane chain terminates in a tri-organo-silicyl group and the other terminal Si still contains a hydrolyzable radical. Such molecules can be converted to poly-siloxanes having both terminal Si atoms bearing three organic radicals linked by C—Si in either of the following ways: (1) continued hydrolysis to replace X with OH and condensation to form

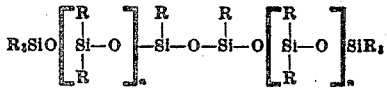

or (2) interaction with R₃SiOH or (3) conjoint hydrolysis and inter-condensation in the presence of R₃SiZ.

It will be seen that the inter-condensates produced by my method are not mixtures of individual organo-siloxanes but are new compounds differing therefrom in homogeneity of structure and properties. It will further be seen that the new organo-siloxanes may contain various different radicals attached to the same silicon atom and the individual silicon atoms may differ in the number and kind of radicals attached thereto, in which respect the new siloxanes differ from previous siloxanes where each silicon atom was attached to the same kind and number of radicals. Such differences result in new compounds or inter-condensates which embody various improvements over previous organo-siloxanes with respect to temperature coefficient of change of viscosity, thermal resistivity, chemical stability, electrical properties, etc.

The organo-siloxanes produced by my method may be adapted to various uses and for any specific use the physical properties and characteristics of the product can be controlled by the proper selection of the initial starting materials so as to obtain the desired oxygen to silicon ratio and a suitable variety of radicals attached to the silicon atom. Some of the products have good electrical properties whereby they may be used as the liquid filling medium for transformers, circuit breakers, submarine cables, condensers, etc. In general the products have an unusually low coefficient of change of viscosity with temperature and find use in hydraulic pressure systems which are subjected to wide changes of temperatures or as lubricants for systems of moving parts operating under subnormal or abnormal temperatures.

I claim:
1. Liquid organopolysiloxanes corresponding to the formula

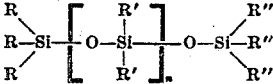

where R, R' and R'' each represents a monovalent hydrocarbon radical, at least one R and at least one R'' each representing a phenyl radical, and $n$ represents a positive integer.

2. Liquid organopolysiloxanes corresponding to the formula

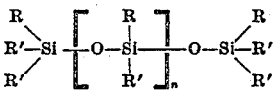

where R represents a phenyl radical, R' represents a lower alkyl radical, and $n$ represents a positive integer.

3. Liquid organopolysiloxanes corresponding to the formula

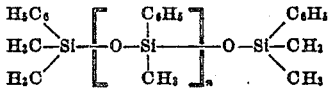

where $n$ represents a positive integer.

4. Liquid organopolysiloxanes corresponding to the formula

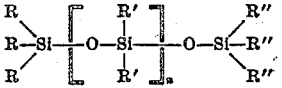

where R, R' and R'' each represents a monovalent hydrocarbon radical, at least one R and at least one R'' each representing a benzyl radical, and $n$ represents a positive integer.

JAMES FRANKLIN HYDE.

REFERENCES CITED

The following references are of record in the file of this patent:

UNITED STATES PATENTS

| Number | Name | Date |
|---|---|---|
| 2,258,218 | Rochow | Oct. 7, 1941 |
| 2,258,219 | Rochow | Oct. 7, 1941 |
| 2,258,220 | Rochow | Oct. 7, 1941 |
| 2,258,221 | Rochow | Oct. 7, 1941 |
| 2,258,222 | Rochow | Oct. 7, 1941 |
| 2,265,962 | Bent | Dec. 9, 1941 |

OTHER REFERENCES

Ladenburg, "Annalen der Chemie," vol. 164, pages 325–328.

Kepping, "Jour. Chem. Soc.," (London) vol. 79, pages 455–458.

Martin, "Jour. Chem. Soc.," (London) vol. 95, pages 307–309.